US012013351B2

(12) United States Patent
Hatano

(10) Patent No.: US 12,013,351 B2
(45) Date of Patent: Jun. 18, 2024

(54) INSPECTION DEVICE

(71) Applicant: ISHIDA CO., LTD., Kyoto (JP)

(72) Inventor: Ryota Hatano, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 263 days.

(21) Appl. No.: 17/642,943

(22) PCT Filed: Jul. 14, 2020

(86) PCT No.: PCT/JP2020/027339
§ 371 (c)(1),
(2) Date: Mar. 14, 2022

(87) PCT Pub. No.: WO2021/059681
PCT Pub. Date: Apr. 1, 2021

(65) Prior Publication Data
US 2022/0365003 A1    Nov. 17, 2022

(30) Foreign Application Priority Data

Sep. 24, 2019   (JP) ................................. 2019-172807

(51) Int. Cl.
*G01N 23/04*   (2018.01)
*G01N 23/083*  (2018.01)
(Continued)

(52) U.S. Cl.
CPC ........... *G01N 23/04* (2013.01); *G01N 23/083* (2013.01); *G01N 23/18* (2013.01); *G06N 20/00* (2019.01);
(Continued)

(58) Field of Classification Search
CPC ...... G01N 23/04; G01N 23/083; G01N 23/18; G01N 2223/1016; G01N 2223/646;
(Continued)

(56) References Cited

U.S. PATENT DOCUMENTS

2012/0327227 A1* 12/2012  Ikeda ................... G01N 21/958
                                                          348/143
2018/0180534 A1*  6/2018  Noda .................... G06T 7/0004

FOREIGN PATENT DOCUMENTS

JP      2003294655 A  * 10/2003    ......... G01M 17/028
JP      2006-071423 A    3/2006
(Continued)

OTHER PUBLICATIONS

International Search REPORT(PCT/JP2020/027339) dated Oct. 20, 2020.
(Continued)

*Primary Examiner* — Kiho Kim
(74) *Attorney, Agent, or Firm* — Global IP Counselors, LLP

(57) ABSTRACT

An inspection apparatus includes an image generation unit, an image processing unit and an inspection unit. The image generation unit is configured to develop one dimensional transmission signal of an article to be inspected passing through an irradiation line of electromagnetic wave into a two dimensional image on a memory. The image processing unit is configured to perform image processing on a partial image every time the partial image including a part of article to be inspected is generated in the image generation unit. The inspection unit is configured to inspect a quality of the partial image after image processing, based on one or more processing results of the image processing unit.

20 Claims, 7 Drawing Sheets

(51) Int. Cl.
  *G01N 23/18* (2018.01)
  *G06N 20/00* (2019.01)
  *G06T 7/00* (2017.01)

(52) U.S. Cl.
  CPC .... *G06T 7/0002* (2013.01); *G01N 2223/1016* (2013.01); *G01N 2223/646* (2013.01); *G01N 2223/652* (2013.01); *G06T 2207/30168* (2013.01)

(58) Field of Classification Search
  CPC ....... G01N 2223/652; G01N 2223/401; G01N 2223/618; G06N 20/00; G06T 7/0002; G06T 2207/30168; G06T 7/0004
  See application file for complete search history.

(56) References Cited

FOREIGN PATENT DOCUMENTS

| | | |
|---|---|---|
| JP | 2009-264915 A | 11/2009 |
| JP | 2010-101692 A | 5/2010 |
| JP | 2011-242374 A | 12/2011 |
| JP | 2012-208084 A | 10/2012 |
| JP | 2017-125800 A | 7/2017 |
| JP | 6387477 B1 | 9/2018 |
| JP | 6537008 B1 | 7/2019 |
| WO | 2018235266 A1 | 12/2018 |

OTHER PUBLICATIONS

International Preliminary Report on Patentability(IPRP) dated Apr. 7, 2022.

* cited by examiner

Fig.5
(a)
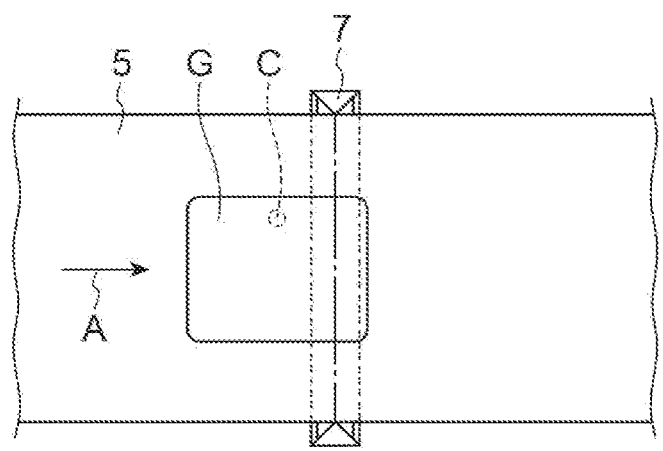
(b)
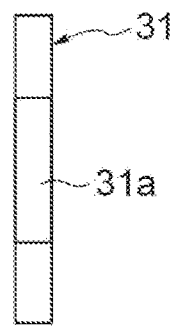
(c)
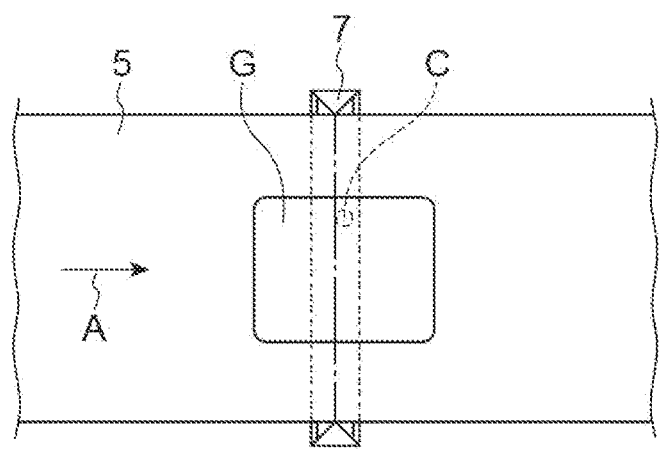
(d)
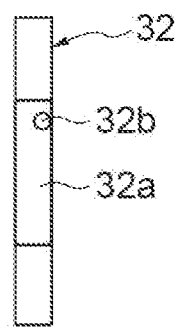
(e)
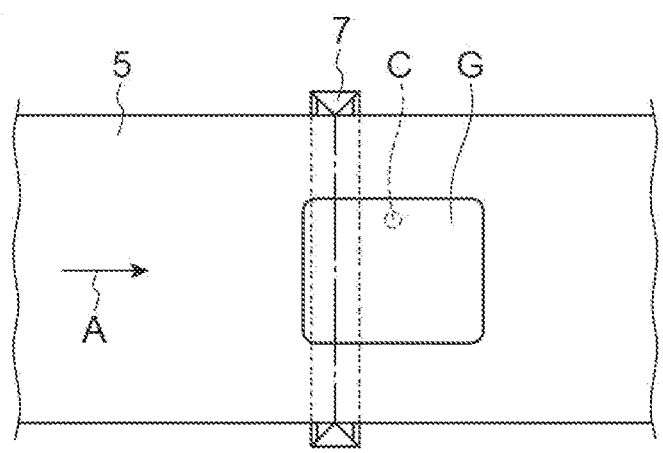
(f)
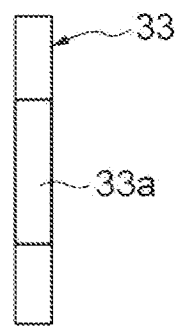

Fig.6
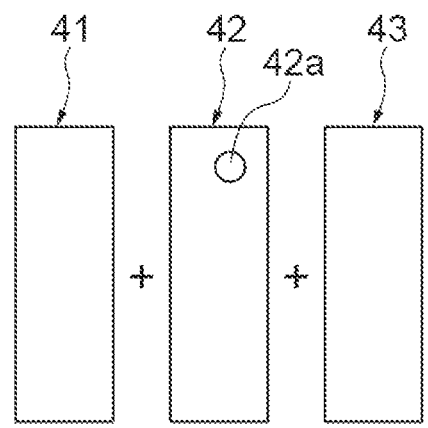
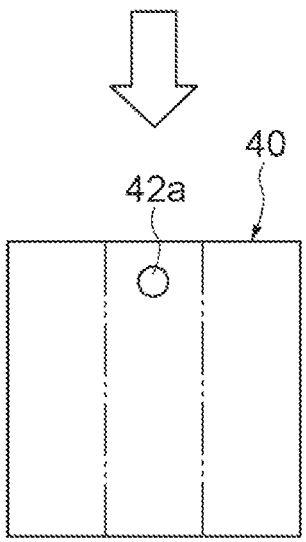

INSPECTION DEVICE

CROSS-REFERENCE TO RELATED APPLICATIONS

This U.S. National stage application of PCT/JP2020/027339 filed Jul. 14, 2020 and claims priority under 35 U.S.C. § 119(a) to Japanese Patent Application No. 2019-172807, filed in Japan on Sep. 24, 2019, the entire contents of which are hereby incorporated herein by reference.

TECHNICAL FIELD

The present disclosure relates to an inspection device.

BACKGROUND ART

One example of the inspection apparatus is an apparatus for inspecting a test object (article to be inspected) such as a packaged food. For example, Patent Document 1 discloses an inspection apparatus in which whole of the image of a test object is divided into a plurality of first partial images and whole of the image is divided into a plurality of second partial images different from the first partial images. In this inspection apparatus, first, the presence or absence of abnormality is determined for a plurality of first partial images, and the presence or absence of abnormality is determined for a plurality of second partial images. Subsequently, the inspection apparatus determines the presence or absence of an abnormality related to the test object based on the overlap between the first partial image determined to include an abnormality and the second partial image determined to include an abnormality.

SUMMARY OF INVENTION

Technical Problem

In Japanese Patent No. 6,387.477, the quality of a test object is determined after whole of the acquired image is divided into a plurality of first partial images and a plurality of second partial images. In such a method, it is likely to take a long time to inspect the quality of one test object.

An inspection apparatus for inspecting an article to be inspected such as a packaged food may be provided in a production line in order to perform in-line measurement. For example, when the method of Japanese Patent No. 6,387,477 is applied to an inspection apparatus provided in a production line, the inspection apparatus becomes a bottleneck of the factory line.

An object of one aspect of the present disclosure is to provide an inspection apparatus capable of determining the quality of an article to be inspected at high speed.

Solution to Problem

An inspection apparatus according to one aspect of the present disclosure includes an image generation unit configured to develop one dimensional transmission signal of an article to be inspected passing through an irradiation line of an electromagnetic wave into a two dimensional image on a memory, an image processing unit configured to perform image processing on a partial image every time the partial image including a part of the article to be inspected is generated in the image generation unit, and an inspection unit configured to inspect a quality of the partial image after image processing, based on one or a plurality of processing results of the image processing unit.

According to this inspection apparatus, when a partial image indicating a part of an article to be inspected is generated by the image generation unit, the image processing unit performs image processing on the partial image, and when the next adjacent partial image is generated, the image processing unit performs image processing on the next partial image. Whenever a partial image is generated in the image generation unit, image processing is repeatedly performed on the newly generated partial image. In this case, while the image generation unit generates the partial image, the image processing unit may perform image processing on the already generated partial image. Accordingly, it is possible to shorten the time from when the article to be inspected passes through the irradiation line to when the inspection of the quality of the article to be inspected is completed. Therefore, by using the inspection apparatus, the quality of the article to be inspected can be determined at high speed.

The image processing unit may perform image processing by adding at least a part of the previously image-processed partial image, for example, a boundary region between the partial image to be processed this time and the previous partial image in contact with the partial image to be processed this time, to the partial image to be image-processed this time. In this case, the inspection unit can satisfactorily inspect the boundary between the partial image subjected to the previous image processing and the partial image subjected to the current image processing. Therefore, the quality of the article to be inspected can be accurately determined.

The inspection unit may inspect the partial image after the image processing in parallel with the image processed by the image processing unit. In this case, while the image processing unit performs image processing on the already generated partial image, the inspection unit may inspect the quality of the already image-processed partial image. As a result, it is possible to further shorten the time from when the article to be inspected passes through the irradiation line to when the inspection of the quality of the article to be inspected is completed. Therefore, the quality of the article to be inspected can be determined at a higher speed.

The electromagnetic wave may be an X-ray, and the quality may be at least one of the presence or absence of foreign object contamination, the presence or absence of cracking or chipping of an article to be inspected, and the presence or absence of a defective product. In this case, at least one of the presence or absence of foreign object contamination in the article to be inspected, the presence or absence of cracking or chipping in the article to be inspected, and the presence or absence of missing parts can be determined at high speed using X-rays.

At least one of the image processing unit and the inspection unit may include a program that is automatically set by machine learning. Even when such a program is applied to the inspection apparatus, the inspection apparatus can determine the quality of the article to be inspected at high speed.

Advantageous Effects of Invention

According to an aspect of the present disclosure, it is possible to provide an inspection apparatus capable of determining the quality of an article to be inspected at high speed.

(a), (c), and (e) of FIG. 5 are schematic views illustrating states in which an object passes through an irradiation line of an electromagnetic wave. (b) of FIG. 5 shows a partial image generated at the first timing, (d) of FIG. 5 illustrates a partial image generated at the second timing, and (f) of FIG. 5 illustrates a partial image generated at the third timing.

FIG. 6 is a schematic view illustrating a plurality of partial images after image processing and a composite image of the partial images.

Figure 7:
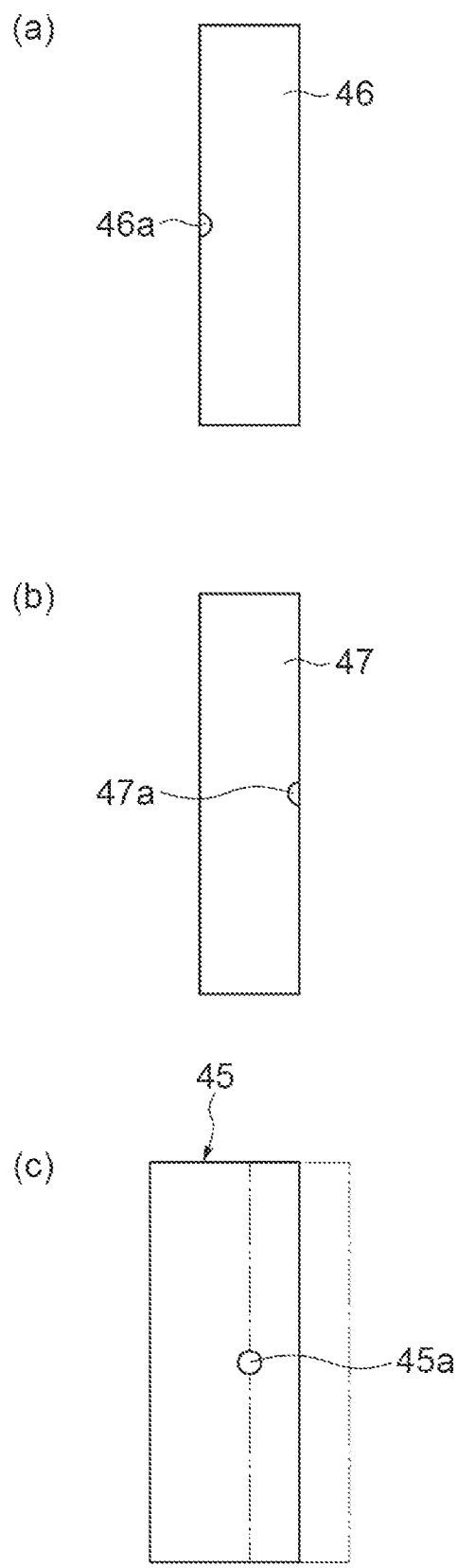

(a) of FIG. 7 is a schematic view showing an image processing result of a predetermined partial image, (b) of FIG. 7 is a schematic view showing an image processing result of a partial image generated immediately after the partial image shown in (a) of FIG. 7, and (c) of FIG. 7 is a view in which a part of the partial image shown in (a) of FIG. 7 and the partial image shown in (b) of FIG. 7 are combined.

DESCRIPTION OF EMBODIMENTS

Hereinafter, an embodiment according to one aspect of the present disclosure will be described with reference to the drawings. In the drawings, the same or corresponding parts are denoted by the same reference numerals, and redundant description will be omitted.

Figure 1:
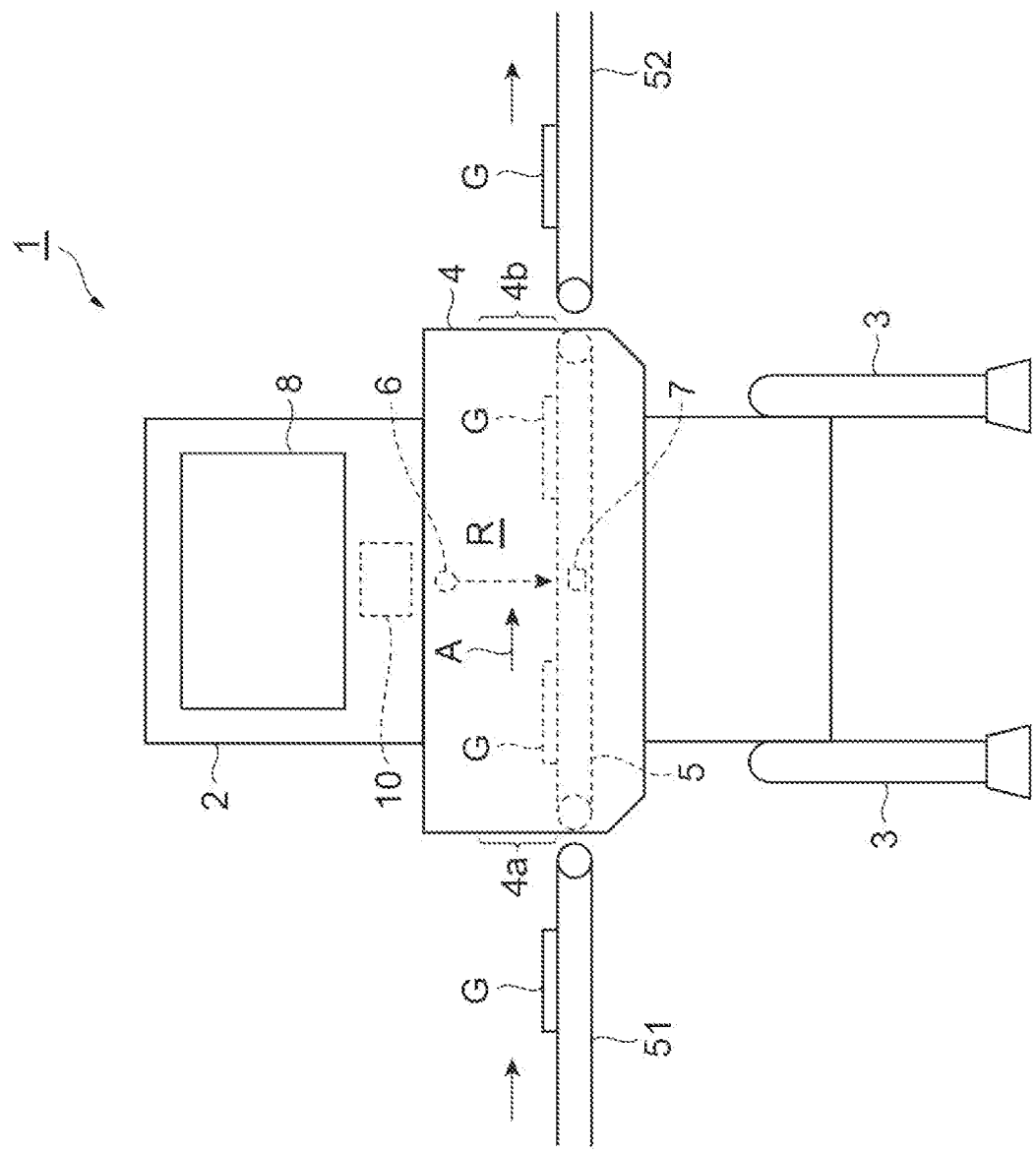
FIG. 1 is a configuration view of an X-ray inspection apparatus according to an embodiment.
Figure 2:
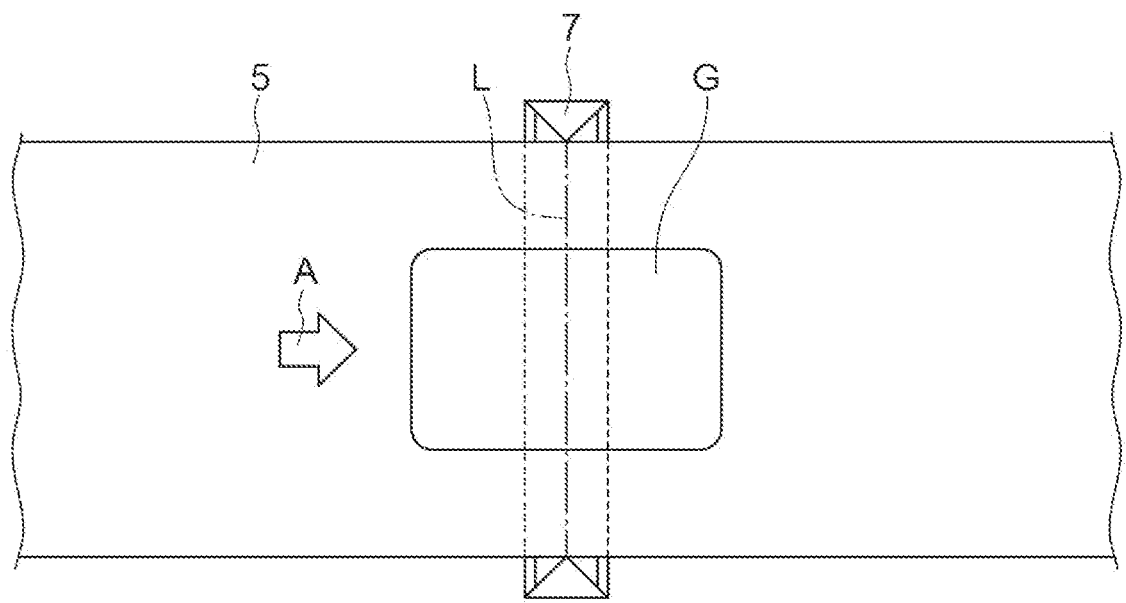
FIG. 2 is a schematic plan view showing a part of the internal configuration of the shield box shown in FIG. 1.

FIG. 1 is a schematic configuration view of an inspection apparatus according to the present embodiment. FIG. 2 is a schematic plan view showing a part of the internal configuration of the shield box shown in FIG. 1. As shown in FIG. 1, an inspection apparatus 1 is an apparatus that inspects the quality of an article G using electromagnetic waves. The article G is a package containing contents such as food, and is an article to be inspected that flows along the transport direction A of the carry-in conveyor 51. The dimensions of the articles G in the transport direction A are substantially the same. In the present embodiment, the electromagnetic wave is an X-ray, and the quality of the article G is at least one of the presence or absence of contamination of a foreign object in the article G, the presence or absence of cracking or chipping of the article G, and the presence or absence of a missing part. Therefore, the inspection apparatus 1 according to the present embodiment is an X-ray inspection apparatus. The quality of the article G is not limited to the presence or absence of foreign object contamination, the presence or absence of cracking and chipping, and the presence or absence of missing parts. For example, as the quality inspection of the article G, inspections of the presence or absence of a cavity, the presence or absence of a shape abnormality, the presence or absence of an accessory to be housed, and the like may be performed. The shortage of the article G includes, for example, that the article G is an empty bag.

The article G before inspection is carried into the inspection apparatus 1 by the carry-in conveyor 51. The inspected article G is carried out of the inspection apparatus 1 by the carry-out conveyor 52. When there is an article G determined as a defective product by the inspection apparatus 1, the article G is excluded, for example, at a subsequent stage (downstream) of the inspection apparatus 1.

The inspection apparatus 1 includes a main body 2, a support leg 3, a shield box 4, a transport conveyor 5, an electromagnetic wave irradiation unit 6, an electromagnetic wave detection unit 7, a display operation unit 8, and a control unit 10.

The main body 2 houses a control unit 10 and the like. The support leg 3 supports the main body 2. The shield box 4 is provided in the main body 2. The shield box 4 prevents leakage of electromagnetic waves to the outside. In the shield box 4, an inspection region R in which an article G is inspected by electromagnetic waves is provided. A carry-in port 4a and a carry-out port 4b are formed in the shield box 4. The article G before inspection is carried into the inspection region R from the carry-in conveyor 51 via the carry-in port 4a. The inspected article G is carried out from the inspection region R to the carry-out conveyor 52 via the carry-out port 4b. Each of the carry-in port 4a and the carry-out port 4b is provided with an electromagnetic wave shielding curtain (not shown) for preventing leakage of electromagnetic waves.

The transport conveyor 5 is disposed in the shield box 4. The transport conveyor 5 conveys the article G along the transport direction A from the carry-in port 4a to the carry-out port 4b via the inspection region R. The transport conveyor 5 is, for example, a belt conveyor stretched between a carry-in port 4a and a carry-out port 4b.

As shown in FIGS. 1 and 2, the electromagnetic wave irradiation unit 6 is an electromagnetic wave source disposed in the shield box 4. The electromagnetic wave irradiation unit 6 irradiates the article G transported by the transport conveyor 5 with electromagnetic waves. In the present embodiment, the electromagnetic wave irradiation unit 6 irradiates the article G with a line-shaped electromagnetic wave extending perpendicularly to the transport direction A in a plan view. The electromagnetic wave irradiation unit 6 includes, for example, an X-ray tube for emitting X-rays and a collimator for expanding the X-rays emitted from the X-ray tube in a fan shape in a plane perpendicular to the transport direction A. In this case, the X-rays irradiated from the electromagnetic wave irradiation unit 6 include, for example, X-rays of various energy bands from low energy (long wavelength) to high energy (short wavelength).

The electromagnetic wave detection unit 7 is a line sensor for detecting electromagnetic waves irradiated from the electromagnetic wave irradiation unit 6, and is disposed in the shield box 4. The electromagnetic wave detection unit 7 is disposed on an irradiation line L of the electromagnetic wave irradiated from the electromagnetic wave irradiation unit 6, and detects the electromagnetic wave transmitted through the article G. The line sensor which is the electromagnetic wave detection unit 7 is configured by electromagnetic wave detection elements (for example, X-ray detection elements) which are one dimensionally arranged along a direction extending perpendicular to the transport direction A in a plan view. The line sensor detects an electromagnetic wave transmitted through the article G and the transport belt of the transport conveyor 5.

As shown in FIG. 1, the display operation unit 8 is a user interface provided in the main body 2. The display operation unit 8 displays various types of information and accepts input of various conditions. The display operation unit 8 is, for example, a liquid crystal display with a touch panel, and displays an operation screen for the touch panel. In this case, the operator can input various conditions via the display operation unit 8.

The control unit 10 is an integrated circuit disposed in the main body 2. The control unit 10 controls the operation of each unit of the inspection apparatus 1. The control unit 10 includes a central processing unit (CPU), a graphic processing unit (GPU), a memory, and the like. The memory includes, for example, a read only memory (ROM), a random access memory (RAM), and the like. The control unit 10 receives the detection result of the electromagnetic wave from the electromagnetic wave detection unit 7.

Figure 3:
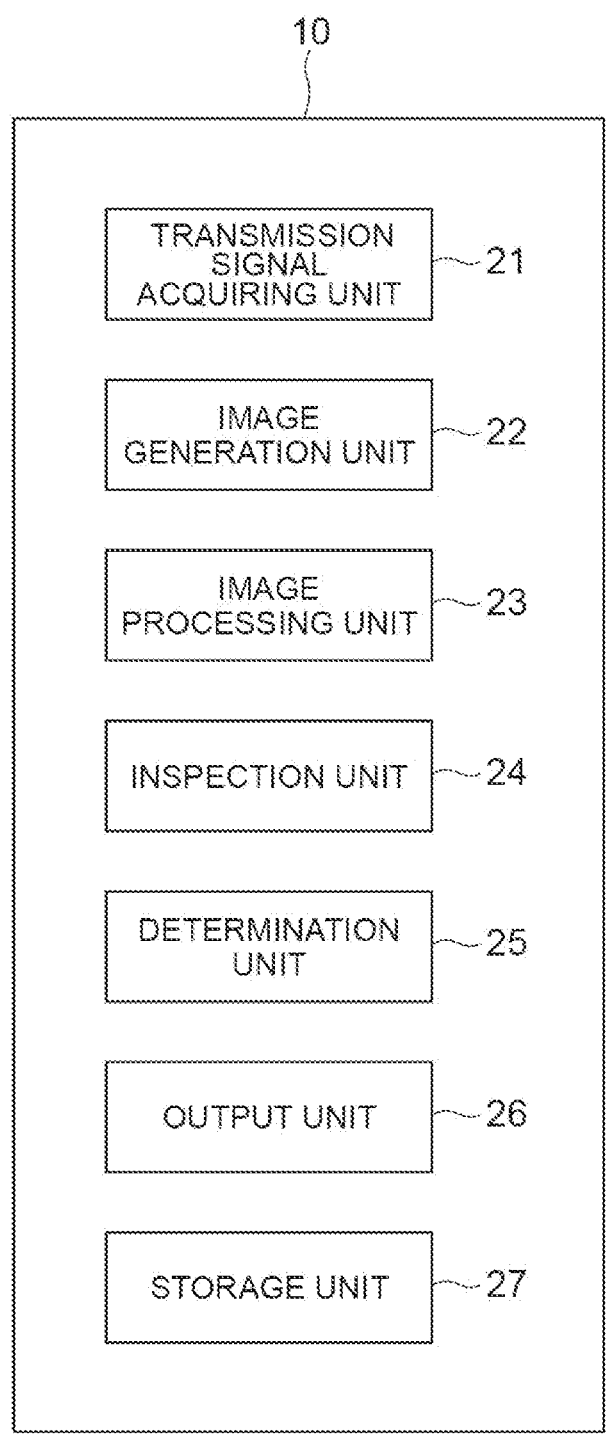
FIG. 3 is a functional block diagram of the control unit.

FIG. 3 is a functional block diagram of the control unit. As shown in FIG. 3, the control unit 10 includes a transmission signal acquiring unit 21, an image generation unit 22, an image processing unit 23, an inspection unit 24, a determination unit 25, an output unit 26, and a storage unit 27.

The transmission signal acquiring unit 21 acquires the detection result of the electromagnetic wave detection unit 7. The detection result of the electromagnetic wave detection unit 7 is, for example, a one dimensional transmission signal of the article G passing through the irradiation line L of the electromagnetic wave. The transmission signal is a signal generated by the electromagnetic wave detection unit 7 detecting an electromagnetic wave transmitted through at least a part of the article G. The transmission signal acquiring unit 21 transmits the acquired one dimensional transmission signal to the image generation unit 22.

The image generation unit 22 is mainly constituted by, for example, a GPU, and develops a transmission signal of the article G into a two dimensional image on a memory. The memory in which the two dimensional image is developed is, for example, a memory included in the GPU, but is not limited thereto. The image generation unit 22 generates, for example, a transmission image (image) based on the detection result of the electromagnetic wave by the electromagnetic wave detection unit 7. In the present embodiment, the image generation unit 22 expands the image of the article G on the memory while the article G passes through the irradiation line L and after the article G passes through the irradiation line L. The image of the article G is a two dimensional image generated from the transmission signals of the article G. An image generated by being read by the image generation unit 22 from an end of the article G at a constant interval (predetermined period) is transmitted to the image processing unit 23 and the storage unit 27 as a partial image of the article G. In the present embodiment, the partial image is an X-ray transmission image in a part of the article G, and is generated using transmission signals acquired within a predetermined period. The predetermined period is shorter than a value obtained by dividing the length of the article G along the transport direction A by the transport speed of the article G by the transport conveyor 5. In this case, whole of the article G can be confirmed by arranging a plurality of partial images in order.

Figure 4:
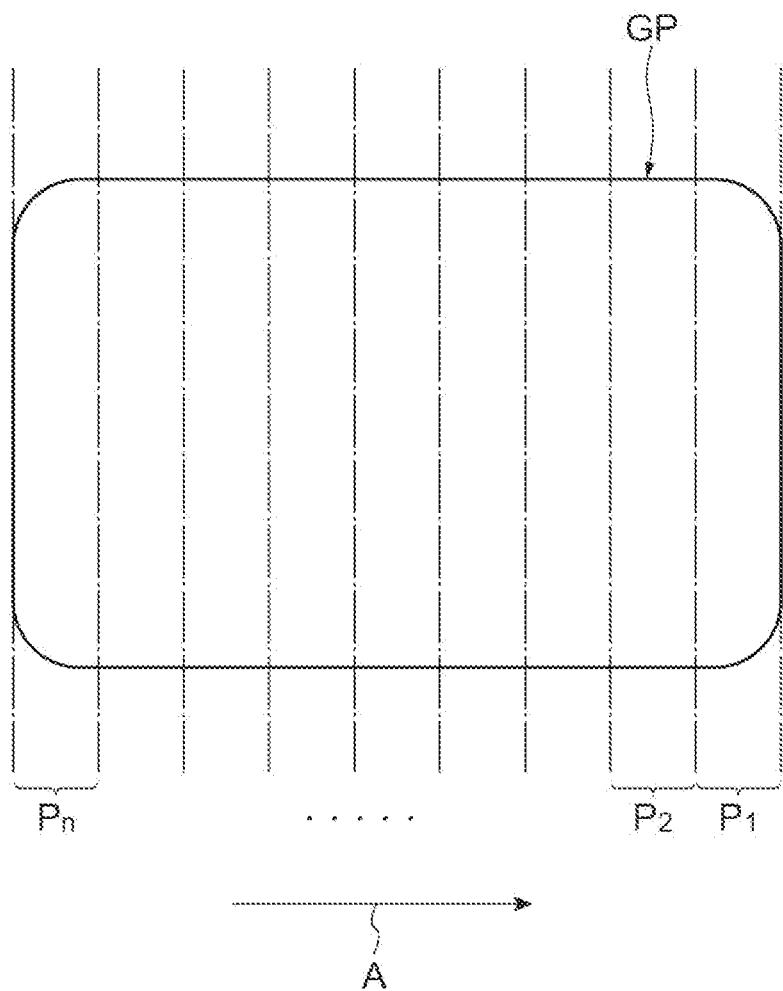
FIG. 4 is a schematic diagram illustrating a composite image of a plurality of partial images.

The image generation unit 22 may combine a plurality of partial images to generate a composite image indicating whole of the article G. FIG. 4 is a schematic view illustrating a composite image of a plurality of partial images. The composite image GP illustrated in FIG. 4 is generated by combining a plurality of partial images $P_1$ to $P_n$ (n is a natural number of 2 or more), and indicates whole of the article G. The partial images $P_1$ to $P_n$ are arranged in order along the transport direction A, and are generated in order. In this way, the partial images $P_1$ to $P_n$ are sequentially read out to the image processing unit 23 at regular intervals from a timing when the two dimensional image is generated by the image generation unit 22, so that the partial images $P_1$ to $P_n$ are sequentially transferred to the image processing unit 23. In FIG. 4, the widths of the partial images $P_1$ to $P_n$ along the transport direction A are constant, but are not limited thereto. For example, the width of the partial image $P_1$ along the transport direction A may be larger than the widths of the other partial image $P_2$ to $P_n$. Each partial image is composed of, for example, 128×128 pixels although it depends on the capacity of the memory.

The image processing unit 23 is mainly constituted by, for example, a GPU, and performs image processing on an image generated by the image generation unit 22. Specifically, the image processing unit 23 performs image processing on the partial image $P_n$ read out from the image generation unit 22. At this time, the image processing may also be performed on the partial image $P_n$ including a part of the processed partial image $P_{n-1}$ (boundary part in contact with each other). Therefore, image processing may be performed twice for the boundary part. Thus, when there is a foreign object on the boundary line, the foreign object can be reliably detected. In the present embodiment, every time a partial image is generated by the image generation unit 22, the image processing unit 23 repeats image processing on the partial image. The image processing on the partial image includes, for example, binarization processing, object region specifying processing, and extraction processing of a feature amount from the object region. The image processing unit 23 transmits a partial image after image processing (hereinafter, also simply referred to as a "processed image") to the inspection unit 24 and the storage unit 27. The image processing unit 23 may perform image processing on a combination of a plurality of partial images. In this case, the image processing unit 23 transmits the synthesized partial image after image processing to the inspection unit 24 and the storage unit 27.

The image processing unit 23 performs image processing on the partial image by using, for example, one or more image processing algorithms. The image processing algorithm is a type indicating a processing procedure of image processing performed on each image. The image processing algorithm is configured by one image processing filter or a combination of a plurality of image processing filters. The plurality of image processing algorithms can be acquired from the outside via a network such as the Internet. The plurality of image processing algorithms can be acquired from an external storage medium such as a USB memory or a removable hard disk. At least one or more of the plurality of image processing algorithms may employ genetic algorithms (GA), which are techniques applying mechanisms of inheritance and evolution in the biological world. In this case, each image can be automatically generated from a plurality of image processing filters based on the specifications of the inspection apparatus 1, inspection conditions, and the like. At least a part of the plurality of image processing algorithms can be appropriately set by, for example, an operator via the display operation unit 8.

The image processing unit 23 may perform the image processing by using a program automatically set by machine learning instead of using the image processing algorithm. Such a program is a prediction model (learned model) generated by machine learning, and is an inference program in which parameters (learned parameters) obtained as a result of machine learning are incorporated. Examples of the machine learning used for the learned model include a neural network, a support vector machine, and a genetic algorithm. The learned model may include a convolutional neural network or a neural network having a plurality of layers (for example, eight or more layers). That is, the learned model corresponding to the program may be generated by deep learning.

The inspection unit 24 inspects the quality of the article G based on the processing result of the image processing unit 23. Examples of the quality of the partial image include, but are not limited to, at least one of the presence or absence of foreign object contamination, the presence or absence of cracking and chipping, and the presence or absence of missing parts. The quality inspection of the article G in the present embodiment includes, for example, a foreign object confirmation inspection, an out-of-stock confirmation inspection, a storage number confirmation inspection, a cavity confirmation inspection, and the like on the image after the image processing. In the present embodiment, the inspection unit 24 inspects the quality of a partial image (that is, a part of the article G) after image processing based on one or a plurality of processing results of the image processing unit 23. The inspection unit 24 inspects the quality of the article G by using, for example, at least one of one or more image processing algorithms and a program automatically set by machine learning. The inspection unit 24 transmits the quality inspection result to the determination unit 25 and the storage unit 27.

In the present embodiment, the inspection unit 24 inspects a partial image after image processing in parallel with image processing by the image processing unit 23. For example, while the inspection unit 24 inspects the quality of a predetermined partial image, the image processing unit 23 performs image processing on a partial image generated after the predetermined partial image.

The determination unit 25 determines whether or not the article G is non-defective based on the quality inspection result received from the inspection unit 24. For example, the determination unit 25 synthesizes the quality inspection results for each partial image to determine the presence or absence of a foreign object in the article G, the presence or absence of a crack or a chip in the article G, the presence or absence of a missing part in the article G, and the like. The determination unit 25 transmits the determination result to the output unit 26 and the storage unit 27.

The output unit 26 outputs the determination result of the determination unit 25 to at least one of a part other than the control unit 10 in the inspection apparatus 1 and an apparatus different from the inspection apparatus 1. Accordingly, at least one of the inspection apparatus 1 and an apparatus different from the inspection apparatus 1 (for example, a sorting apparatus disposed downstream of the inspection apparatus 1) can perform an operation when the article G is a defective product. As another example of the device different from the inspection apparatus 1, for example, a carry-in conveyor 51, a carry-out conveyor 52, a notification device, and the like are exemplified.

The storage unit 27 records signals, data, and the like generated by the control unit 10. For example, the storage unit 27 records the transmission signal transmitted from the transmission signal acquiring unit 21, the data of each partial image and composite image transmitted from the image generation unit 22, the partial image after image processing, the processing result of the partial image, and the data of the composite image after image processing transmitted from the image processing unit 23, the quality inspection result transmitted from the inspection unit 24, and the determination result transmitted from the determination unit 25. The storage unit 27 may record, for example, a composite image obtained by performing image processing on a certain article G and a quality inspection result of the article G in association with each other. In this case, confirmation of the quality inspection result for each article G by the operator can be speeded up.

Next, an example of a method of acquiring a partial image of the article G will be described with reference to (a) to (f) of FIG. 5. (a), (c), (e) of FIG. 5 are schematic diagrams showing states in which the article G passes through the irradiation line L of the electromagnetic wave. As shown in (a), (c), (e) of FIG. 5, a foreign object C is included in the article G.

(a) of FIG. 5 shows the positional relationship between the article G and the electromagnetic wave detection unit 7 at the first timing. At the first timing, the foreign object C is located upstream of the electromagnetic wave detection unit 7 in the transport direction A. (b) of FIG. 5 illustrates a partial image 31 generated at the first timing. The partial image 31 is a two dimensional image developed on the memory based on a transmission signal acquired within a predetermined period with the first timing as an end point, and includes a part 31a indicating a part of the article G.

(c) of FIG. 5 shows the positional relationship between the article G and the electromagnetic wave detection unit 7 at the second timing. At the second timing, the foreign object C is overlapped with the electromagnetic wave detection unit 7 in a plan view. (d) of FIG. 5 shows the partial image 32 generated at the second timing. The partial image 32 is different from the part 31a and includes a part 32a indicating a part of the article G and a part 32b indicating a foreign object C. The partial image 32 is a two dimensional image developed on the memory based on a transmission signal acquired within a period in which the first timing is a start point and the second timing is an end point. In the present embodiment, the partial image 32 is generated during a period from generation of the partial image 31 to image processing of the partial image 31.

(e) of FIG. 5 shows the positional relationship between the article G and the electromagnetic wave detection unit 7 at the third timing. At the third timing, the foreign object C is located downstream of the electromagnetic wave detection unit 7 in the transport direction A. (f) of FIG. 5 shows a partial image 33 generated at the third timing. The partial image 33 is different from the parts 31a and 32a, and includes a part 33a indicating a part of the article G. The partial image 33 is a two dimensional image developed on the memory based on a transmission signal acquired within a period in which the second timing is a start point and the third timing is an end point. In the present embodiment, the partial image 33 is generated during a period from generation of the partial image 32 to image processing of the partial image 32. Alternatively, the partial image 33 may be generated until the image processing of the partial image 31 is completed. In other words, the predetermined partial image in the present embodiment is generated until the image processing of the partial image generated before the partial image is completed.

FIG. 6 is a schematic diagram illustrating a plurality of partial images after image processing and a composite image of the plurality of partial images. FIG. 6 shows processed images 41 to 43 corresponding to partial images after image processing. The processed image 41 is obtained by performing image processing on the partial image 31 illustrated in (b) of FIG. 5. Similarly, the processed image 42 is obtained by image-processing the partial image 32 shown in (d) of FIG. 5, and the processed image 43 is obtained by image-processing the partial image 33 shown in (f) of FIG. 5. A composite image 40 is obtained by combining the processed images 41 to 43. In the processed image 42, a part 32b corresponding to the part 42a of the partial image 32 and indicating the foreign object C is displayed. The processed image 42 is obtained, for example, during the inspection of the processed image 41. The processed image 43 is obtained, for example, during the inspection of the processed image 41 or during the inspection of the processed image 42.

Next, the operation and effect of the inspection apparatus 1 according to the present embodiment described above will be described with reference to a comparative example described below. The inspection apparatus according to the comparative example has substantially the same configuration as that of the inspection apparatus 1. However, in the inspection apparatus according to the comparative example, unlike the inspection apparatus according to the present embodiment, after an image including whole of the article to be inspected is generated, image processing is performed on the image. That is, in the comparative example, a partial image of article to be inspected is not generated. Then, the quality of the article to be inspected is inspected based on the processing result of the image including whole of the article to be inspected. In such a comparative example, the image processing and the quality inspection are performed only after whole of the article to be inspected passes through the irradiation line of the electromagnetic wave. Therefore, depending on the load of image processing, the number of quality inspection items, or the like, it may take several seconds from when the article to be inspected passes through the irradiation line to when the quality inspection of the article to be inspected is completed. In recent years, in order to increase the speed of the production line, the time required for the inline measurement of article to be inspected is very short, for example, less than one second. Therefore, when the inspection apparatus according to the comparative example described above is introduced into a production line, the inspection apparatus becomes a bottleneck in the production line.

On the other hand, in the inspection apparatus 1 according to the present embodiment, the image processing unit 23 repeats image processing on a partial image each time the partial image indicating a part of the article G that is article to be inspected is generated. In this case, while the image generation unit 22 generates a partial image, the image processing unit 23 may perform image processing on the already generated partial image. As a result, the time from when the article G passes through the irradiation line L to when the inspection of the quality of the article G is completed can be shortened. Thus, by using the inspection apparatus 1, the quality of the article G can be determined at high speed. Therefore, for example, even if the inspection apparatus 1 is introduced into a production line, the inspection apparatus 1 can be prevented from becoming a bottleneck in the production line.

In the present embodiment, the inspection unit 24 inspects the partial image after the image processing in parallel with the image processing by the image processing unit 23. Thus, while the image processing unit 23 performs image processing on the already generated partial image, the inspection unit 24 may inspect the quality of the already image-processed partial image. Accordingly, it is possible to further shorten the time from when the article G passes through the irradiation line L to when the inspection of the quality of the article G is completed. Therefore, the quality of the article G can be determined at a higher speed.

In the present embodiment, the electromagnetic wave is an X-ray, and the quality is at least one of the presence or absence of foreign object contamination, the presence or absence of cracking and chipping, and the presence or absence of missing parts. For this reason, at least one of the presence or absence of foreign object contamination, the presence or absence of cracking and chipping, and the presence or absence of missing parts in the article G can be determined at high speed using X-rays.

In the present embodiment, at least one of the image processing unit 23 and the inspection unit 24 may include a program that is automatically set by machine learning. In general, the time required for image processing or the like using a program automatically set by machine learning is likely to be longer than that in the case of simply using an image processing algorithm. However, in the inspection apparatus 1, the processing using the program is performed while the article G passes through the irradiation line L. Thus, in the inspection apparatus 1, the amount of data processed after the article G passes through the irradiation line L is significantly reduced as compared with the comparative example. Therefore, the inspection apparatus 1 can determine the quality of the article G at high speed even when the above-described program is used.

Hereinafter, modifications of the above-described embodiment will be described. In the following modifications, the description of the same parts as those in the above embodiment will be omitted. Therefore, differences from the above embodiment will be mainly described below.

First, with reference to (a) and (b) of FIG. 7, a description will be given of a possibility that an erroneous determination is made by determining the quality of an object based on only the quality inspection result of a partial image. (a) of FIG. 7 is a schematic diagram illustrating an image processing result of a predetermined partial image. (a) of FIG. 7 shows a processed image 46 which is a partial image after image processing. The processed image 46 includes a part 46a indicating a foreign object C. The size of the part 46a is smaller than the size with which the inspection apparatus 1 can determine that the object is a foreign object C. Therefore, for example, when the quality of only the processed image 46 is inspected, there is a high possibility that the quality of the processed image 46 is determined to be good.

(b) of FIG. 7 is a schematic diagram illustrating an image processing result of a partial image generated immediately after the partial image illustrated in (a) of FIG. 7. (b) of FIG. 7 shows a processed image 47 which is a partial image after image processing. The processed image 47 includes a part 47a indicating a foreign object C. The size of the part 47a is smaller than the size that can be determined as a foreign object C by the inspection apparatus 1, as in the case of the part 46a. Therefore, for example, when the quality of only the processed image 47 is inspected, there is a high possibility that the quality of the processed image 47 is determined to be good. Therefore, when the quality inspection results of the processed images are simply synthesized, the quality of the object may be erroneously determined.

On the other hand, in the present modification, the quality of a composite image obtained by combining a plurality of partial images after image processing except for the firstly generated partial image is inspected. (c) of FIG. 7 is a diagram in which a part of the partial image shown in (a) of FIG. 7 and the partial image shown in (b) of FIG. 7 are combined. In this modification, image processing is performed by adding a boundary region between the partial image to be processed this time and the previous partial image that is in contact with the partial image to be processed this time to the partial image to be processed this time. Specifically, as shown in (c) of FIG. 7, a composite image 45 is generated by adding a part of the previously image-processed partial image to the currently image-processed partial image and performing image processing (i.e., repeating image processing). Such a composite image 45 includes a part 46*a* obtained by combining parts 47*a* and 45*a* shown in (a) and (b) of FIG. 7. The part 45*a* is equal to or larger than a size that allows the inspection apparatus 1 to determine that the foreign object C is present. Therefore, when the quality of the composite image 45 is inspected, it is possible to more reliably determine that a foreign object is included in the object.

In the modified example described above, the same operation and effect as those of the embodiment described above are exhibited. In addition, in the present modification, the quality of a composite image obtained by combining a plurality of partial images after image processing except for the partial image firstly generated is inspected. As a result, the quality of the object is less likely to be erroneously determined. Therefore, in the present modification example, it is possible to achieve both an increase in speed of the quality inspection of the object and an increase in accuracy of the quality inspection.

Although the embodiments and the modifications according to one aspect of the present disclosure have been described above, one aspect of the present disclosure is not limited to the above-described embodiments and modifications. For example, although the image processing unit and the inspection unit are separate constituent parts in the above-described embodiment and the above-described modification, the present disclosure is not limited thereto. For example, the inspection unit may be part of an image processing unit. In any case, in one aspect of the present disclosure, the control unit performs image processing and inspection of the partial image.

In the above-described modification, the composite image is obtained by performing image processing by adding a part of the partial image subjected to the previous image processing to the partial image to be subjected to the current image processing, but is not limited thereto. The composite image may be obtained, for example, by combining a part of the previously image-processed partial image and the currently image-processed partial image. In other words, the composite image may be generated without further performing image processing on the partial image that has been previously subjected to image processing. For example, the composite image may be obtained by combining whole of the partial image subjected to the previous image processing and the partial image subjected to the current image processing. Alternatively, not only the previously image-processed partial image but also a previously image-processed partial image may be combined with the currently image-processed partial image. In other words, the composite image may include a plurality of image-processed partial images.

In the above embodiment and the above modification, a partial image after image processing may be divided into a plurality of regions, and the quality of each region may be inspected. In this case, the quality of the plurality of regions divided by the first method and the quality of the plurality of regions divided by the second method different from the first method may be inspected.

The invention claimed is:

1. An inspection apparatus comprising:
    an image generation unit configured to develop one dimensional transmission signal of an article to be inspected passing through an irradiation line of an electromagnetic wave into a two-dimensional image on a memory;
    an image processing unit configured to perform image processing on a partial image each time the partial image including a part of the article to be inspected is generated in the image generation unit; and
    an inspection unit configured to inspect a quality of the partial image after image processing, based on one or more processing results of the image processing unit,
    the inspection unit is configured to inspect the image-processed partial image while the image processing unit performs image processing on a pre-processed partial image.

2. The inspection apparatus according to claim 1, wherein the image processing unit is configured to perform image processing by adding at least a part of a previously image-processed partial image to a currently image-processed partial image.

3. The inspection apparatus according to claim 1, wherein the inspection unit is configured to inspect the partial image after image processing in parallel with the image processing by the image processing unit.

4. The inspection apparatus according to claim 1, wherein the electromagnetic wave is an X-ray, and
    wherein the quality is at least one of the presence or absence of foreign object contamination, the presence or absence of cracking or chipping, and the presence or absence of missing parts.

5. The inspection apparatus according to claim 1, wherein at least one of the image processing unit and the inspection unit includes a program automatically set by machine learning.

6. The inspection apparatus according to claim 1, wherein the image processing unit is configured to perform image processing on a composite image including whole of a latest generated partial image and at least a part of a just before generated partial image.

7. The inspection apparatus according to claim 6, wherein the inspection unit is configured to inspect a quality of the composite image after image processing.

8. An inspection apparatus comprising:
    an image generation unit configured to sequentially generate a first partial image and a second partial image of an article to be inspected based on a transmission signal of the article;
    an image processing unit configured to sequentially perform image processing on the first partial image and the second partial image; and
    an inspection unit configured to sequentially inspect a quality of an image-processed first partial image and a quality of an image-processed second partial image, based on one or more processing results of the image processing unit.

9. The inspection apparatus according to claim 8, wherein the image processing unit is configured to perform image processing by adding at least a part of the first partial image to the second partial image.

10. The inspection apparatus according to claim 8, wherein
    the inspection unit is configured to inspect the processed first partial image with the image processing on the second partial image by the image processing unit.

11. The inspection apparatus according to claim 8, wherein
    the electromagnetic wave is an X-ray, and
    wherein the quality is at least one of the presence or absence of foreign object contamination, the presence or absence of cracking or chipping, and the presence or absence of missing parts.

12. The inspection apparatus according to claim 8, wherein at least one of the image processing unit and the inspection unit includes a program automatically set by machine learning.

13. The inspection apparatus according to claim 8, wherein
the image processing unit is configured to perform image processing on a composite image including at least a part of the first image and whole of the second partial image.

14. The inspection apparatus according to claim 13, wherein
the inspection unit is configured to inspect a quality of a processed composite image.

15. The inspection apparatus according to claim 8, wherein
the inspection unit is configured to inspect a processed first partial image while the image processing unit performs image processing on the second partial image.

16. An inspection apparatus comprising:
an image generation unit configured to develop one dimensional transmission signal of an article to be inspected passing through an irradiation line of an electromagnetic wave into a two-dimensional image on a memory;
an image processing unit configured to perform image processing on a partial image each time the partial image being a part of the article to be inspected is generated in the image generation unit; and
an inspection unit configured to inspect a quality of a composite image obtained by combining a plurality of partial images after image processing, based on one or more processing results of the image processing unit,
wherein the image processing unit is configured to perform the image processing by adding at least a part of a previously image-processed partial image to a currently image-processed partial image.

17. The inspection apparatus according to claim 16, wherein the inspection unit is configured to inspect the partial image after image processing in parallel with the image processing by the image processing unit.

18. The inspection apparatus according to claim 16, wherein the electromagnetic wave is an X-ray, and
wherein the quality is at least one of the presence or absence of foreign object contamination, the presence or absence of cracking or chipping, and the presence or absence of missing parts.

19. The inspection apparatus according to claim 16, wherein at least one of the image processing unit and the inspection unit includes a program automatically set by machine learning.

20. The inspection apparatus according to claim 16, wherein the image processing unit is configured to perform image processing on a composite image including whole of a latest generated partial image and at least a part of a just before generated partial image.

* * * * *